United States Patent
Ohk

(10) Patent No.: US 9,171,237 B2
(45) Date of Patent: Oct. 27, 2015

(54) PRINTING CONTROLLING TERMINAL APPARATUS, IMAGE FORMING APPARATUS AND METHOD FOR CONTROLLING PRINTING USING THE SAME

(71) Applicant: SAMSUMG ELECTRONICS CO., LTD., Suwon-si, Gyeonggi-so (KR)

(72) Inventor: Hyung-soo Ohk, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/078,760

(22) Filed: Nov. 13, 2013

(65) Prior Publication Data

US 2014/0139856 A1 May 22, 2014

(30) Foreign Application Priority Data

Nov. 20, 2012 (KR) .......................... 10-2012-0131864

(51) Int. Cl.
| | | |
|---|---|---|
| *G06K 15/02* | (2006.01) | |
| *H04N 1/23* | (2006.01) | |
| *H04N 1/60* | (2006.01) | |
| *H04N 1/40* | (2006.01) | |

(52) U.S. Cl.
CPC ........ *G06K 15/1867* (2013.01); *G06K 15/1801* (2013.01); *H04N 1/233* (2013.01); *H04N 1/2369* (2013.01); *H04N 1/6072* (2013.01); *H04N 1/40062* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 5,287,204 A | 2/1994 | Koizumi et al. | |
| 6,240,203 B1 | 5/2001 | Kawano et al. | |
| 8,390,884 B2 * | 3/2013 | Suzuki et al. | 358/1.9 |
| 2005/0168764 A1 * | 8/2005 | Yamamura | 358/1.13 |
| 2005/0180645 A1 * | 8/2005 | Hasegawa et al. | 382/239 |
| 2006/0008139 A1 * | 1/2006 | Hirota et al. | 382/162 |
| 2006/0222240 A1 * | 10/2006 | Hirota et al. | 382/162 |
| 2008/0062483 A1 * | 3/2008 | Morimoto | 358/530 |
| 2008/0117484 A1 | 5/2008 | Kang | |
| 2010/0046831 A1 * | 2/2010 | Kang | 382/166 |
| 2010/0060915 A1 * | 3/2010 | Suzuki et al. | 358/1.9 |
| 2011/0228361 A1 * | 9/2011 | Ohkawa | 358/505 |

(Continued)

FOREIGN PATENT DOCUMENTS

| | | |
|---|---|---|
| EP | 0503644 | 9/1992 |
| EP | 1926301 | 5/2008 |
| JP | 2007-274287 | 10/2007 |
| JP | 2010004383 A * | 1/2010 |

(Continued)

*Primary Examiner* — Kimberly A Williams
(74) *Attorney, Agent, or Firm* — Staas & Halsey LLP

(57) ABSTRACT

A printing controlling terminal apparatus, an image forming apparatus, and a printing controlling method thereof are provided. The printing controlling terminal apparatus includes a user interface that receives a command to print regarding a document, a determiner that determines if the document intended by the command to print is printed in color, a print data generator that generates print data regarding the document according to a result of the determining, and a communicator that transmits the generated print data to an image forming apparatus. The determiner divides each page of the document into a plurality of blocks, extracts color information from each of the plurality of blocks by applying weighted values to color values of the plurality of divided blocks, and determines whether to print the document in color based on the color information.

25 Claims, 12 Drawing Sheets

(56) References Cited

U.S. PATENT DOCUMENTS

2013/0259364 A1* 10/2013 Shindo et al. ............... 382/164
2014/0129399 A1* 5/2014 Matsunaga et al. .......... 705/34

FOREIGN PATENT DOCUMENTS

KR 10-2008-0046080 5/2008
KR 10-2010-0034476 4/2010

* cited by examiner

FIG. 5

| 0 | 1 | 1 | 1 | 1 | 1 | 1 | 1 |
|---|---|---|---|---|---|---|---|
| 0 | 1 | 1 | 2 | 1 | 2 | 2 | 1 |
| 0 | 1 | 2 | 2 | 1 | 2 | 2 | 1 |
| 0 | 1 | 2 | 2 | 1 | 2 | 2 | 1 |
| 0 | 1 | 2 | 2 | 2 | 2 | 2 | 1 |
| 0 | 1 | 1 | 1 | 0 | 0 | 0 | 0 |
| 0 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

400 — upper region
401 — lower region

PRINTING CONTROLLING TERMINAL APPARATUS, IMAGE FORMING APPARATUS AND METHOD FOR CONTROLLING PRINTING USING THE SAME

CROSS-REFERENCE TO RELATED APPLICATIONS

This application is related to, and claims priority to, Korean Patent Application No. 10-2012-0131864, filed on Nov. 20, 2012, in the Korean Intellectual Property Office, the disclosure of which is incorporated herein by reference.

BACKGROUND

1. Field

Embodiments of the present disclosure relate to a printing controlling terminal apparatus, an image forming apparatus, and a method for controlling printing using the same, and more specifically, to a printing controlling terminal apparatus that accurately determines whether documents are colored, an image forming apparatus and a printing controlling method thereof.

2. Description of the Related Art

Image forming apparatuses are able to scan voluminous documents, automatically determine whether the scanned documents are colored or monochromatic ("mono"), and output or copy in color or mono format. Such image forming apparatuses can automatically determine whether documents are colored or mono. Conventional methods for perceiving colors divide documents into a plurality of blocks, compare color value of pixels that make up the divided blocks with standard values, and determine whether the blocks are colored.

Conventional methods compare pixel values with standard values to determine if the pixels are colored or mono, and increase the number of color pixels if the pixels are colored or increase the number of mono pixels if the pixels are mono. The methods determine whether the documents are colored or mono by using a ratio of the number of color pixels and the number of mono pixels.

Such conventional methods may uniformly process data regardless if a color value of pixel is slightly or substantially smaller or larger than a standard grey value. Thus, according to conventional methods, documents that a user perceives may be different from documents that are automatically determined. If blocks are divided into color or mono pixels and determined by using standard values, it may not be possible to determine whether documents are colored as actually perceived by the user.

Further, color pixels may be scattered or may be gathered in specific areas. A problem may occur in that the two cases may be determined to be color or mono if the number of color pixels are the same in these two cases, even though a user can perceive that one case is mono and other is color.

SUMMARY

Additional aspects and/or advantages will be set forth in part in the description which follows and, in part, will be apparent from the description, or may be learned by practice of the invention.

Exemplary embodiments of the present invention overcome the above disadvantages and other disadvantages not disclosed above. An exemplary embodiment of present is not required to overcome the disadvantages disclosed above.

According to an exemplary embodiment, a printing controlling terminal apparatus is provided that extracts color information in a documents precisely and determines whether documents are colored, an image forming apparatus thereof and a printing controlling method using the same.

According to an exemplary embodiment, a printing controlling terminal apparatus may include a user interface that receives a command to print regarding a document, a determiner that determines if the document intended by the command to print is to be printed in color, a print data generator that generates print data regarding the document according to a result of the determining, and a communicator that transmits the generated print data to an image forming apparatus. The determiner may divide each page of the document into a plurality of blocks, extract color information from each of the plurality of blocks by applying weighted values to color values of the plurality of divided blocks, and determine whether to print the document in color based on the color information.

The determiner may calculate the weighted values based on a difference between the color values of the plurality of blocks and a standard value, and extract color information per block by applying the calculated weighted values to the color values of the plurality of blocks.

If the difference is smaller than a preset value, the determiner may extract the color information as a first step value by applying the first weighted value to the color value and, if the difference is greater than or equal to the preset value, the determiner may extract color information as greater than a second step value by applying the second weighted value to the color value.

If a ratio of the color information is greater than or equal to a preset critical value, the determiner may determine the document to be color, and if ratio of the color information is less than the preset critical value, the determiner may determine the document to be mono.

The determiner may determine whether to print in color by determining continuity and color saturation of the blocks having a value greater than or equal to the second step value.

If there are greater than, or equal to, a preset number of continuously-formed blocks with values equal to, or greater than, the second step value on horizontal or vertical direction, the determiner may apply a preset weighted value to the color information of corresponding blocks according to the number of the continuously-formed blocks.

In an embodiment, an image forming apparatus may include a determiner that determines whether to print print data regarding a document in color, an image processor that generates printing image regarding the print data according to a result of the determining, and an image former that performs a printing job by using the generated printing image. The determiner may divide each page of the document into a plurality of blocks, extract color information from each of the plurality of blocks by applying weighted values to color values of the plurality of divided blocks, and determine whether to print the document in color format based on the color information.

The determiner may calculate the weighted values based on a difference between the color values of the plurality of blocks and a standard value, and apply the calculated weighted values to the color values of the plurality of blocks to weight each of color information.

If the difference is smaller than a preset value, the determiner may extract the color information as a first step by applying the first weighted value to the color value and value, and if the difference is greater than or equal to the preset value, the determiner may extract the color information as greater than, or equal to, the second step value by applying the second weighted value to the color value.

If ratio of the color information is greater than or equal to a preset critical value, the determiner may determine the document to be color, and if ratio of the color information is less than the preset critical value, the determiner may determine the document to be mono.

The determiner may determine whether to print in color by determining continuity and color saturation of the blocks having greater than or equal to the second step value.

If there are greater than, or equal to, a preset number of continuously formed blocks with values equal to, or greater than, the second step value in a horizontal or vertical direction, the determiner may apply a preset weighted value to the color information of corresponding blocks according to the number of the continuously-formed blocks.

According to an exemplary embodiment, a printing controlling method of a printing controlling terminal apparatus is provided including inputting a command to print regarding a document, determining if the document intended by the command to print is printed in color, generating print data regarding the document according to a result of the determining, and transmitting the generated print data to an image forming apparatus. The determining may divide each page of the document into a plurality of blocks, extract color information from each of the plurality of blocks by applying weighted values to color values of the plurality of divided blocks, and determine whether to print the document in color based on the color information.

The determining may include calculating the weighted values based on a difference between the color values of the plurality of blocks and standard value, and extracting color information by applying the calculated weighted values to the color values of the plurality of blocks, respectively.

If the difference is smaller than a preset value, the determining may include extracting the color information as a first step value by applying the first weighted value to the color value, and if the difference is greater than or equal to a preset value, the determining comprises extracting the color information as greater than the second step value by applying the second weighted value to the color value.

If ratio of the color information is greater than, or equal to, a preset critical value, the determining may include determining the document to be color, and if ratio of the color information is less than preset critical value, the determining may include determining the document to be mono.

The determining may include determining whether to print in color by determining continuity and color saturation of the blocks having greater than or equal to the second step value.

If there are at least a preset number of continuously-formed blocks with values equal to, or greater than the second step value on horizontal or vertical direction, the determining may include applying a preset weighted value to the color information of corresponding blocks according to the number of the continuously-formed blocks.

In an embodiment, a printing controlling method of an image forming apparatus is provided, which may include determining whether to print print data regarding a document in color, generating printing image regarding the print data according to a result of the determining, and performing a printing job by using the generated printing image. The determining may divide each page of the document into a plurality of blocks, extract color information from each of the plurality of blocks by applying weighted values to color values of the plurality of divided blocks, and determine whether to print the document in color format based on the color information.

The determining may include calculating the weighted values based on a difference between the color values of the plurality of blocks and a standard value, and extracting color information, respectively, by applying the calculated weighted values to the color values of the plurality of blocks.

If the difference is smaller than a preset value, the determining may include extracting the color information as a first step value by applying the first weighted value to the color value and, if the difference is greater than, or equal to, the preset value, the determining may include extracting the color information as greater than, or equal to, the second step value by applying the second weighted value to the color value.

If ratio of the color information is greater than, or equal to, a preset critical value, the determining may include determining the document to be color, and if ratio of the color information is less than the preset critical value, the determining may include determining the document to be mono.

The determining may include determining whether to print in color by determining continuity and color saturation of the blocks having greater than, or equal to, the second step value.

If there are greater than, or equal to, a preset number of continuously-formed blocks with values equal to, or greater than the second step value on horizontal or vertical direction, the determining may include applying a preset weighted value to the color information of corresponding blocks according to the number of the continuously-formed blocks.

In an embodiment, a computer-readable recording medium recording codes regarding a printing controlling method of a printing controlling terminal apparatus is provided, in which the printing controlling method may include inputting a command to print regarding a document, determining if the document intended by the command to print is printed in color, generating print data regarding the document according to a result of the determining, and transmitting the generated print data to an image forming apparatus. The determining may divide each page of the document to a plurality of blocks, extract color information from each of the plurality of blocks by applying weighted values to color values of the plurality of divided blocks, and determine whether to print the document in color based on the color information.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 5 illustrates an exemplary operation of a color information extractor;

DETAILED DESCRIPTION

Figure 1:
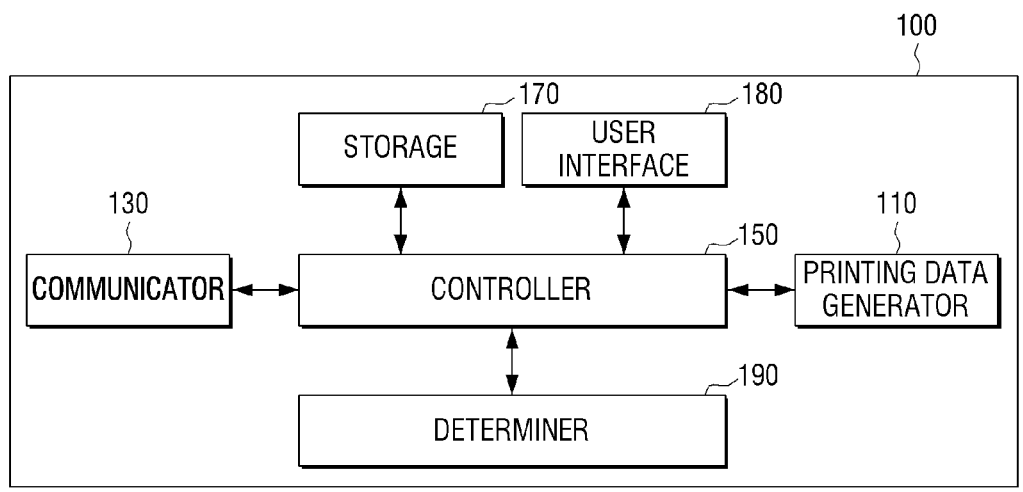
FIG. 1 illustrates a printing controlling terminal apparatus according to an embodiment.

Certain exemplary embodiments of the present invention are described in detail with reference to the accompanying drawings.

Same drawing reference numerals are used for the same elements even in different drawings. Exemplary items defined in the description, such as detailed construction and elements, are provided to assist in a comprehensive understanding of the present invention. Accordingly, it is apparent that exemplary embodiments of the present invention can be carried out without those specifically defined items.

FIG. 1 illustrates a printing controlling terminal apparatus according to an embodiment.

As illustrated in FIG. 1, a printing controlling terminal apparatus 100 communicates with an image forming apparatus 200 via a communicator 130. The printing controlling terminal apparatus 100 may include a print data generator 110, a communicator 130, a controller 150, a storage 170, a user interface 180, and a determiner 190.

The print data generator 110 generates print data to print documents in the image forming apparatus 200. Such print data may be expressed in page description language. Page description language may be defined as a language explaining descriptions of pages to be printed in a higher level than actual bitmap output. Examples of page description language include Page Description Language (PDL), Printer Command Language (PCL), and Samsung Page Language (SPL).

The communicator 130 transmits print data to the image forming apparatus 200 and receives situation information from the image forming apparatus 200. The communicator 130 may be implemented with Universal Serial Bus (USB) communication and/or Simple Network Management Protocol (SNMP) communication.

The controller 150 may include a driver (not illustrated) and a CPU (not illustrated). The controller 150 may include RAM (not illustrated) and ROM (not illustrated).

The controller 150 analyzes whether to create a printing of a complete message included in situation information received from the image forming apparatus 200. In other words, if determining that printing a complete message is created, the controller 150 completes operation of the print data generator 110.

Even after completing transmitting print data to the image forming apparatus 200, the controller 150 keeps print data in a spooler included in the printing data generator 110 without receiving printing complete message from the printing data generator 110.

The storage 170 stores information regarding generated print data, information regarding printing jobs and information regarding the image forming apparatus 200.

The user interface 180 receives a command to print of documents.

The determiner 190 determines whether to print a document for which a command to print is inputted in color format. At the time of determining, the determiner 190 divides each page of the document into a plurality of blocks. The determiner 190 compares color values of the divided plural blocks with a standard value and extracts color information in each block of the plurality of blocks. The determiner 190 determines whether to print the document in a color format based on the color information.

Figure 3:
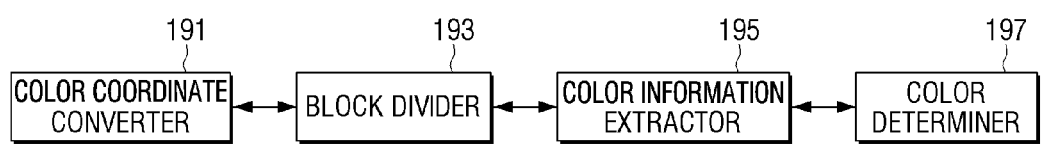
FIG. 3 illustrates an exemplary determiner.

FIG. 3 illustrates an exemplary determiner.

As illustrated in FIG. 3, the determiner according to an embodiment includes a color coordinate converter 191, a block divider 193, a color information extractor 195, and a color determiner 197.

The color coordinate converter 191 converts RGB image into preset color coordinate. At this process, the color coordinate may be YCbCr, Lab, XYZ, or LUV expressed as brightness and color value.

The block divider 193 divides image into a preset number of blocks. A preset number may be defaulted to as a basic value at the printing controlling terminal apparatus 100 and the image forming apparatus 200, or may be modified by a user after defaulting.

The color information extractor 195 extracts color information by using a color signal value of pixels within each divided block. The color information extractor 195 extracts color information having a smaller value when a color signal value of a specific block comes to a standard grey color value. In other words, the color information extractor 195 may extract color information of the block to be the first step value if a color signal value within the block is the same as a neutral grey color value. The color information extractor 195 may extract color information of the block to be the second step value according to difference between the color signal value and neutral grey color value. Extracting color information is disclosed.

The color determiner 197 determines whether an image is colored by using a ratio of extracted color information. The color determiner 197 determines that an image is colored if a ratio of image color information is greater than, or equal to, a preset critical value, and that an image is mono if a ratio of image color information is less than a preset critical value.

The color determiner 197 determines a continuity of blocks having a greater than, or equal to, the second step value. In other words, if there are more than a preset number of blocks having a greater than, or equal to, the second step value continuously formed on horizontal or vertical direction, the color determiner 197 applies a preset weighted value to color information of block and modifies the color information according to the number of continuously formed blocks.

According to an exemplary embodiment conversion is into YCbCr coordinates that is used in the image forming apparatus 200. The color coordinate converter 191 may not operate if an RGB image is used as input.

The block divider 193 divides an image into a preset number of blocks. For example, the block divider may divide an image into M×N blocks, wherein M>1 and N>1.

Figure 4:
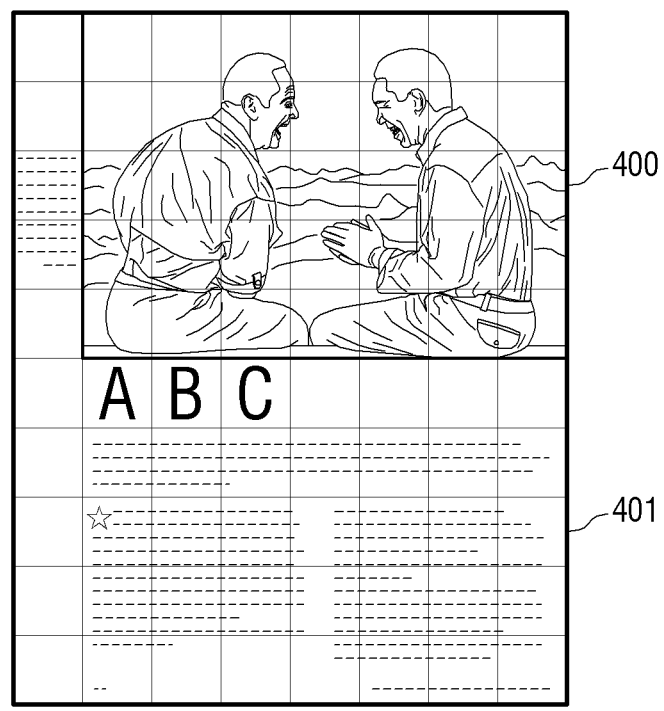
FIG. 4 illustrates an exemplary operation of a block divider.

Dividing an image into a preset number of blocks is disclosed. FIG. 4 illustrates an image scanned by a scanner, e.g., scanner 203 in FIG. 2. It may be assumed that area 400 has an image expressed in various colors, and an area 401 has black texts and characters including small size images or colors in the middle. The block divider 193 divides image into blocks, for example, 8×10 blocks, i.e., into 80 blocks.

FIG. 5 exemplarily illustrates a display state of color information in each block that the color information extractor 195 extracts and marks regarding the blocks in the image of FIG. 4 divided by the block divider 193. The color information "1" or "2" may be extracted from each block of area 400 having an image expressed with various colors, and color information "0" may be extracted from each block of area 401 that mainly have black texts. The numbers "0," "1," "2," illustrated in FIG. 5 indicate extracted color information of each block. The number "0" indicates that a corresponding block is a mono block. The number "1" indicates that a corresponding block is a first color block. The number "2" indicates that a corresponding block is a second color block.

The first color block may be classified as a mono block or a color block depending on how the standard value is set. As illustrated in FIG. 4 and FIG. 5, a block having extracted color information "1" may be perceived as a mono block if a preset standard value is modified. If blocks established to be "1" are perceived as mono, a ratio between a total number of mono blocks and a total number of color blocks in an image may change, a ratio of the number of color blocks may be smaller than predefined critical value, and the image may be determined to be mono.

According to an embodiment, since color blocks may be more minutely divided into first color blocks and second color blocks, specific blocks that can be included in mono blocks by modifying a preset standard value may be included in first color blocks, and thus, color blocks in the image may be counted more precisely.

Although FIGS. 4 and 5 illustrate an exemplary division of the image into 8×10 blocks, but an embodiment is not so limited. A number of blocks may be set differently according to image size. A processing speed of a determining between color and mono regarding an image may be slower as a number of blocks increases. However, a determining of results may be more precise.

If a color signal of pixels made within each of blocks divided by the block divider 193 has a color signal value close to a neutral grey color value, the color information extractor 195 extracts various color information from the first step value to an (n)th step value, where n is a natural number equal to, or greater than 2 and n increases as a grey color value is divided into more plural areas.

Figure 12:
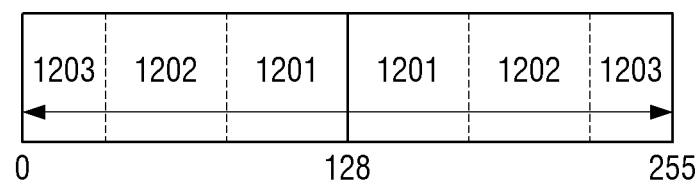
FIG. 12 illustrates an example of color information per section to extract color information according to an embodiment.

Extracting color information by the color information extractor 195 is illustrated in FIG. 12.

FIG. 12 illustrates an example of color information per section to extract color information according to an embodiment.

As illustrated in FIG. 12, a neutral grey color value may be preset, for example, as 128th of a standard value. The first area 1201 within the first standard value range preset based on the neutral grey color value may be defined as an area having the same or most similar color values compared to the neutral grey color value. If a color value of a specific block belongs to the color value of the first area 1201, the color information extractor 195 extracts color information of the block as the first step value.

The second area 1202 may be defined as an area out of the first standard value preset based on the neutral grey color value and within the second standard value. If a color value of a specific block belongs to a color value of the second area 1202, the color information extractor 195 extracts color information of the block as the second step value.

The third area 1203 may be defined as an area out of the first and second standard values preset based on the neutral grey color value and within the third standard value. If a color value of specific block belongs to the third area 1203, the color information extractor 195 extracts color information of the block as the third step value.

Although FIG. 12 divides a range of color value into three sections 1201.1202, and 1203 this is merely an exemplary embodiment. A range of color value may be divided into greater than 3 sections. Methods may compare a color value of a specific value with a standard value and distinguish between mono or color only. In other words, if a color value of a specific block belongs to a mono section, color information is extracted to be 0. If a color value of a specific block belongs to a color section, color information is extracted to be 1.

Methods may extract color information as 0 or 1 even if pixels are on boundaries between a mono section and a color section. However, if using a method of extracting color information according to an exemplary embodiment of the present invention, color information can be extracted to be any one of 0, 1, and 2. Thus, because the printing controlling terminal apparatus 100 and the image forming apparatus 200 according to an embodiment can determine color information of image pixels more precisely, image color may be determined a more similar to what a user perceives.

Figure 2:
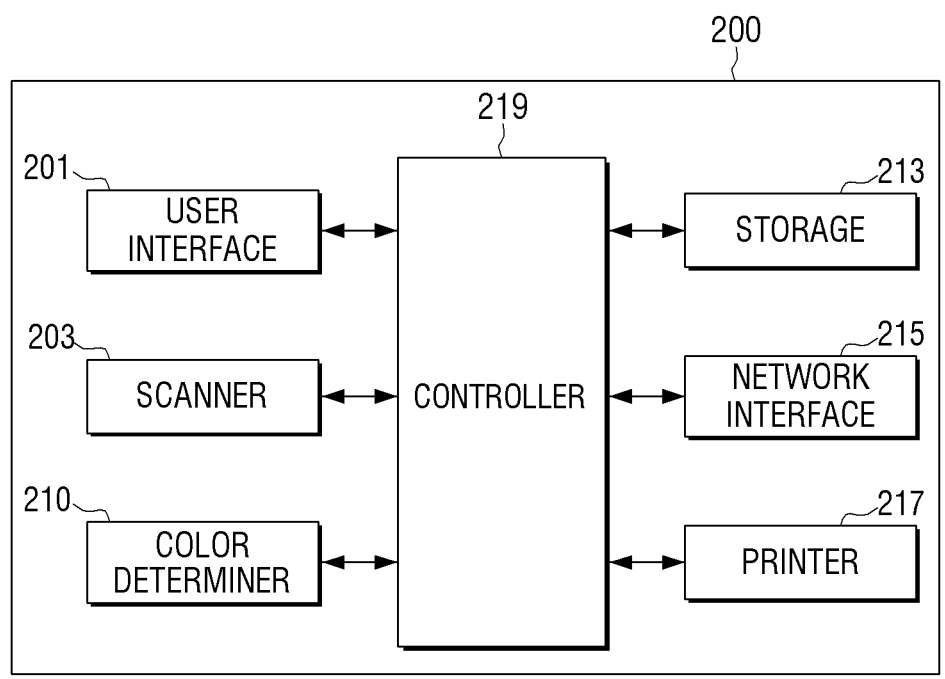
FIG. 2 illustrates an image forming apparatus according to an embodiment.

The color coordinate converter 191, illustrated in FIG. 3, converts a RGB image scanned by the scanner 203 in FIG. 2 into YCbCr color coordinate, and divides the converted image to preset number of blocks. Color signal values of pixels in divided blocks are Cb and Cr. The color information extractor 195 calculates each color information by using average values of Cb and Cr regarding pixels in each block. Because a brightness value "Y" may be unnecessary to determine whether information is to be color or mono, only an average values of Cb and Cr are calculated, and color information is extracted by using the calculated average values.

The color determiner 197 determines whether the image is color by using a ratio of color information extracted from each block of the image. The color determiner 197 determines continuity of color blocks, and whether the image is color based on a ratio and a continuity of color blocks. The color determiner 197 uses color information extracted from each block, and determines whether the image is color or mono.

The color determiner 197 may calculate ratio of color blocks by mathematical formula 1:

$$Color_{ratio} = \frac{N_{color}}{N_{total}} \quad \text{[Formula 1]}$$

where $Color_{ratio}$ is a ratio of color blocks, $N_{color}$ is a number of classified color blocks, and $N_{total}$ is a total number of divided blocks. The number of color blocks may include the numbers of first color blocks and second color blocks. Thus, the color information extractor 195 extracts color information regarding each block, calculates a number of color blocks by using the extracted color information, and a total number of divided blocks as the same as the number of blocks divided by the block divider 193.

The color determiner 195 calculates a ratio of color blocks by formula 1, determines that the image is color if the ratio of color blocks is greater than or equal to a preset critical value, and determines that the image is mono if the ratio of color blocks is less than preset critical value.

Determining the color of a specific image by the color determiner 195 is explained referring to FIG. 4.

As illustrated in FIG. 4, the block divider 193 divides a previously inputted image into a number of blocks, e.g., 80 blocks. The color information extractor 195 extracts color information regarding the 80 blocks. If color information in each block is "0," the corresponding block is mono, and if color information in each block is "1" or "2," the corresponding block is color.

A method for determining whether an image is color or mono based on the extracted color information regarding divided blocks may use a ratio of the extracted color information to determine, or, apply weighted value to color information and use a ratio of color information applied with weighted value to determine.

It may be determined whether image is color or mono by using a ratio of color information. Referring to the exemplary image divided into 80 blocks illustrated in FIG. 4, the number of blocks having a value of "0" of extracted color information is 41, the number of blocks having a value of "1" of extracted color information is 24, and the number of blocks having a value of "2" of extracted color information is 15.

If information has a value of "1" or "2," a corresponding block is determined to be color. If information has a value of "0," a corresponding block is determined to be mono. The image divided into 80 blocks of FIG. 4 includes 39 color blocks and 41 mono blocks.

If a preset critical value is established to determine that the image is color when 40 or more color blocks are included, the analyzed image of FIG. 4 may be determined to be mono.

If a preset critical value is established to determine that the image is color when 35 or more color blocks are included, the analyzed image of FIG. 4 may be determined to be color. Thus, if determining whether the image is color based on a ratio of the extracted color information in FIG. 4, results of determining whether the image is color or mono may be different according to which value is established as preset critical value.

A user may arbitrarily change and establish the preset critical value. If a critical value is established to be greater, the image can be determined to be color when it has more color blocks.

An exemplary method for determining whether an image is color or mono by using extracted color information applies different weighted values to corresponding color blocks according to continuity, if color blocks are made continuously, modifies previously extracted color information, and determines whether the image is color according to the ratio of the modified color information.

Figure 6A:
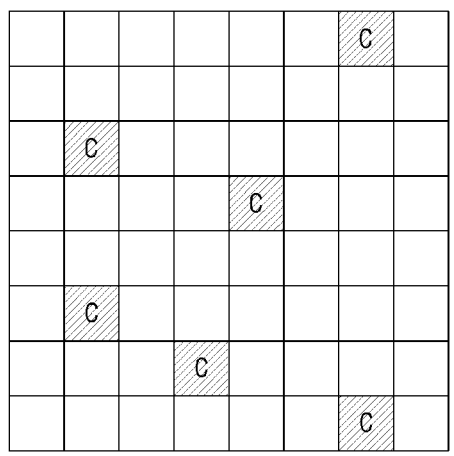
FIG. 6A and FIG. 6B illustrate an exemplary operation of a color determiner.
Figure 6B:
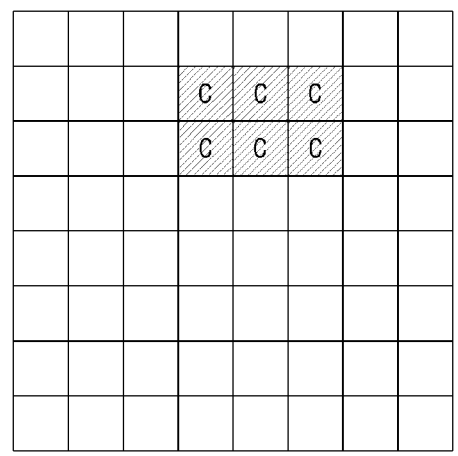

An exemplary method is explained referring to FIG. 6A and FIG. 6B.

FIG. 6A and FIG. 6B illustrate an exemplary color determiner. As illustrated, an exemplary image of FIGS. 6A and 6B may be divided into 64 blocks, and includes 6 color blocks.

In FIG. 6A, 6 color blocks are scattered. In FIG. 6B, 6 color blocks are gathered in a specific area. A user may perceive a color of the images in FIGS. 6A and 6B differently. Thus, it may be necessary to determine that the image of FIG. 6B is color among the images of FIGS. 6A and 6B.

However, according to some methods, if 6 blocks of 64 blocks are color, it may not be possible to distinguish FIGS. 6A and 6B from each other solely based on the ratio of color blocks.

The color determiner 197 in an exemplary embodiment of the present invention may determine whether color blocks are continuously made greater or equal to a preset number. If there are at least a preset number of continuously-formed color blocks, the color determiner 197 determines that there is continuity. If there are less than the preset number of continuously-formed color blocks, the color determiner 197 determines that there is no continuity.

Because the printing controlling terminal apparatus 100 and the image forming apparatus 200 according to an embodiment may determine continuity of color blocks, FIG. 6A and FIG. 6B may be perceived and determined differently to determine whether the image is color or mono.

When determining if there are at least a preset number of continuously-formed color blocks, the color determiner 197 may use a standard that there are at least a P number of color blocks horizontally or that there are at least a Q number of color blocks vertically.

Determining whether there are at least preset number of continuously-formed color blocks will be described in detail referring to FIG. 7.

Figure 7:
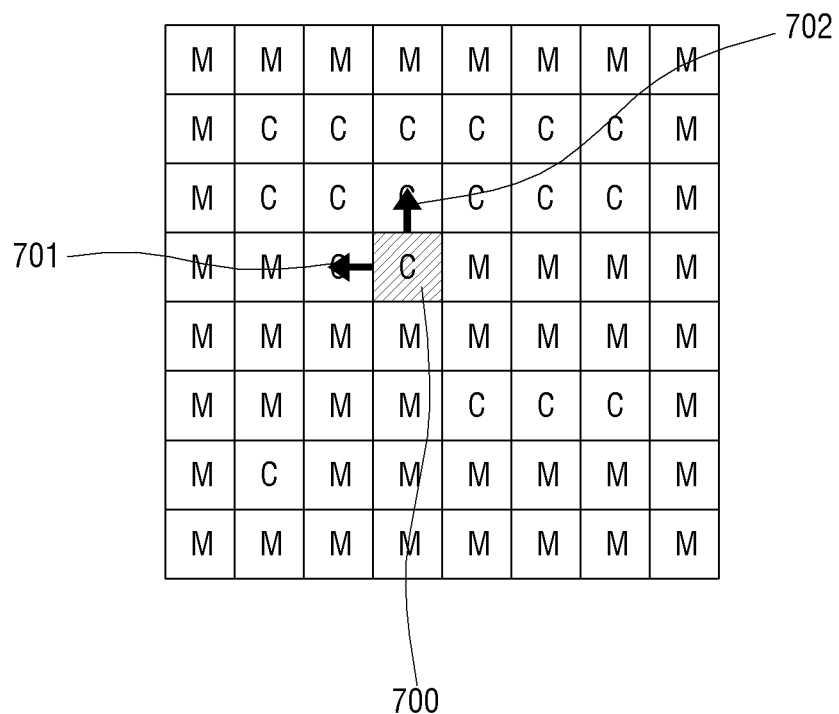
FIG. 7 illustrates an exemplary continuity of color blocks by a color determiner.

FIG. 7 illustrates an exemplary continuity of color blocks by a color determiner, e.g., the color determiner 197 of FIGS. 1 and 2.

As illustrated in FIG. 7, regarding an image divided into horizontal 8× vertical 8 blocks, i.e., 64 blocks, of mono (M) or color (C) of color information may be allocated to each block. A block 700, illustrated with hatching, may be assumed to be the block allocated with color information extracted by the color information extractor 195. Based on block 700, there is another color block in a direction 701, and another two color blocks in a 702.

The color determiner 197 analyzes that block 700 continues indicating two color blocks horizontally and three blocks vertically. The color determiner 197 multiplies corresponding weighted value of Table 1 by the corresponding block, and corrects color information of the block.

TABLE 1

| vertical pixels | horizontal pixels | | | |
| --- | --- | --- | --- | --- |
| | 0~10 | 10~20 | 20~30 | 30~ |
| 0~10 | 1 | 1.1 | 1.2 | 1.3 |
| 10~20 | 1.1 | 1.2 | 1.3 | 1.4 |
| 20~30 | 1.2 | 1.3 | 1.4 | 1.5 |
| 30~ | 1.3 | 1.4 | 1.5 | 1.6 |

Table 1 illustrates a number of pixels continued vertically and a number of pixels continued horizontally. The image is divided into 64 blocks in FIG. 7; however, a corresponding block includes at least one pixel. If dividing the image to a corresponding block having 16 pixels, the hatched block 700 has 4 consecutive pixels horizontally and 12 consecutive pixels vertically. Thus, according to Table 1, a corresponding block is applied with 1.1 of weighted value.

Table 1 illustrates an example of weighted values according to the number of consecutive pixels, and weighted values may be differently established in various embodiments.

The color determiner 197 performs the determining continuity regarding every block determined to be color, and applies a weighted value to a corresponding block.

The color determiner 197 may determine color saturation of color blocks. In other words, the color determiner 197 determines color saturation of color blocks, for example, simultaneously while determining continuity of color blocks, and determine whether corresponding document is printed in color format. The color determiner 197 determines whether corresponding image is color according to ratio of color blocks applied with weighted value.

FIG. 2 illustrates an image forming apparatus according to an embodiment.

As illustrated in FIG. 2, an image forming apparatus 200 according to an embodiment includes a user interface 201, a scanner 203, a determiner 210, a storage 213, a network interface 215, a printer 217, and a controller 219. The image forming apparatus 200 also includes various electronic apparatuses such as an ink jet printer, a laser printer, a scanner, a copy machine, a fax, or a multi complex unit.

The user interface 201 supports an interface between a user and the image forming apparatus 200, and may receive request signals requesting operations like copying, scanning, and printing.

The scanner 203 scans document and inputs image. A scanner may scan a document to generate a RGB image, and thus, the image has R, G, B values.

The determiner 210 of FIG. 2 may performs similar functions as the determiner 190 of the printing controlling terminal apparatus 100. The determiner 210 includes a color coordinate converter (not illustrated), a block divider (not illustrated), a color information extractor (not illustrated), and a color determiner (not illustrated).

Detailed explanations of the determiner 210 are disclosed herein.

The storage 213 may store images scanned by the scanner 203 and images previously inputted by the image forming apparatus 200. Further, the storage 213 may store color coordinate value converted by the color coordinate converter 205, or temporarily store the number of continued color blocks on line and column bases when determining continuity of color blocks in the color determiner 210.

The network interface 215 supports interface between the image forming apparatus 200 and network. The image forming apparatus 200 may transmit images to other devices like a user terminal apparatus (not illustrated) and external storage medium (not illustrated) through the network interface 215.

The printer 217 outputs images. The image forming apparatus 200 supports both of color and mono printing, and the printer 217 may perform color printing and mono printing by a user selection or by determining results of the color determiner 210.

The controller 219 controls functions of the image forming apparatus 200. In other words, the controller 219 controls input and output of signals between the user interface 201, the scanner 203, the color coordinate converter 191, the block divider 193, the color information extractor 195, the color determiner 197, the storage 213, the network interface 215, and the printer 217.

If the image forming apparatus 200 performs copying, the controller 219 controls the scanner 203 to scan document to generate image, the block divider 193, the color information extractor 195, and the color determiner 197 to operate determining whether the image is color or mono, and the printer 219 to output color image or mono image according to determining results.

If image is transmitted to other devices, the controller 219 controls the network interface 215 to compress the color and mono images determined by operations of the block divider 193, the average calculator (not illustrated), the block determiner (not illustrated), and the image determiner (not illustrated) in corresponding format, and to transmit the compressed color and mono images to other devices.

The image forming apparatus 200 divides one image into plural blocks, determines whether each block is color or mono by using average value of color signals from pixels constituted in each block, and determines whether the image is color or mono by using ratio of color blocks.

Accordingly, if the scanner 203 scans image combining constant ratios of R, G, B colors, the color determiner 210 determines that the image is mono consequentially. Thus, if copying a document combining constant ratios of R, G, B colors by using the image forming apparatus 200, the printer 219 performs mono printing even when the inserted document to the image forming apparatus 200 is color.

When dividing inputted image to a preset number of blocks and extracting color information regarding specific block, the image forming apparatus 200 according to an embodiment does not determine simply that the block is mono or color, but divides the color or mono step more minutely, and can determine whether the block is color more precisely. Further, the image forming apparatus 200 determines a continuity of color blocks, and applies different weighted values to color information of the block by continuity results to change color information. Thus, a color image that a user visually perceives may be determined more efficiently.

Figure 8:
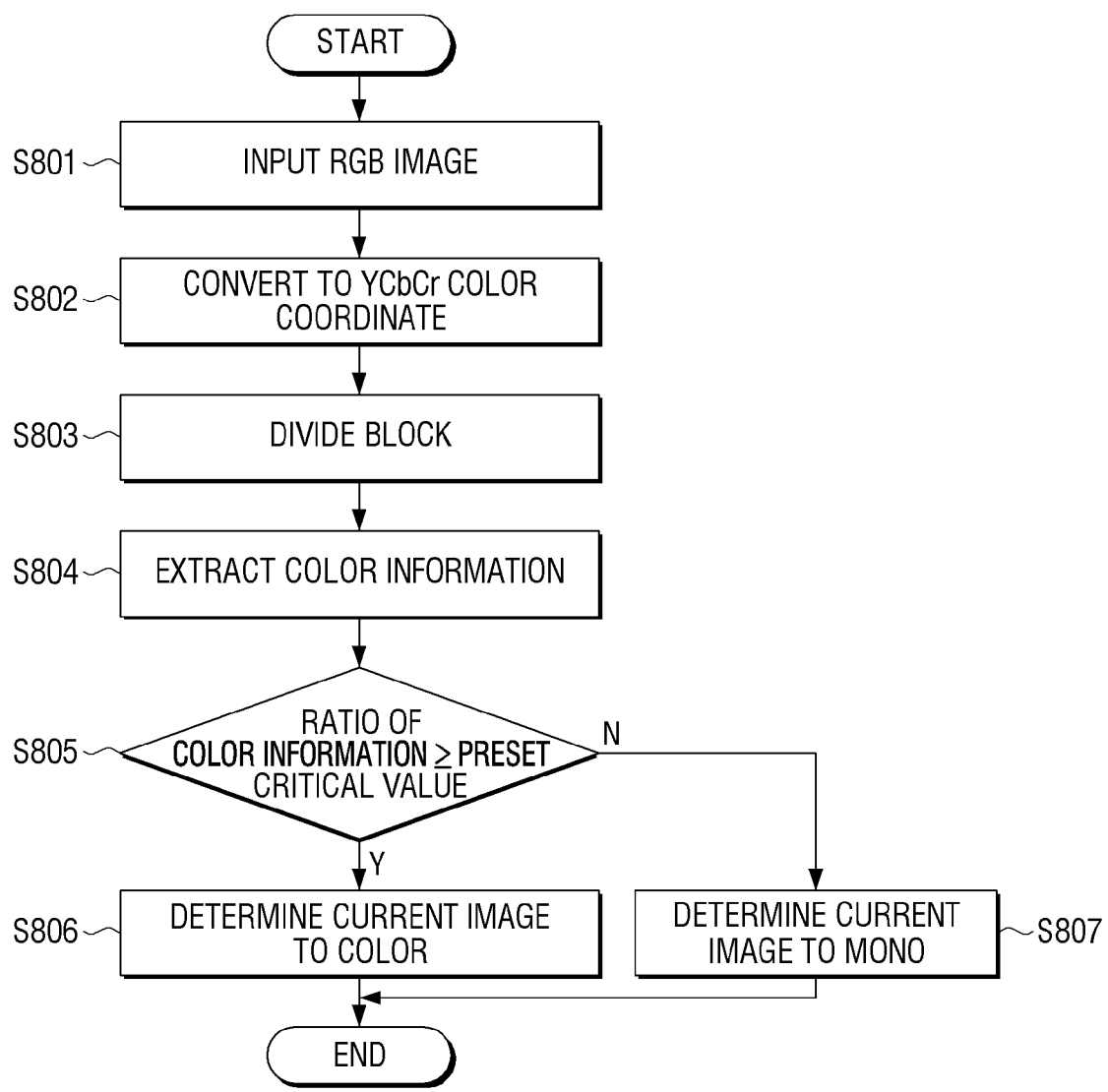
FIG. 8 illustrates an exemplary image processing method of an image forming apparatus according to an embodiment.

FIG. 8 illustrates an exemplary image processing method of the image forming apparatus according to an embodiment.

As illustrated in FIG. 8, the image forming apparatus 200 receives RGB image at S801. Inputted RGB image is converted to YCbCr color coordinate at S802. Even though FIG. 8 illustrates a converting to YCbCr color coordinates, the invention is not limited to YCbCr color coordinates only.

The color coordinate converted image may be divided into a preset number of blocks at S803. For example, if the image has a 1280×1024 resolution and if the image is divided into N number of blocks, one block may have at least one pixel. As a preset number N increases, the image may be divided into more blocks, and each of divided blocks may be determined to be color or mono. Thus, whether the image is color or mono may be determined more precisely. However, since more calculating may be needed for the processing as the number of blocks increases, the number of divided blocks should be appropriately determined. A number of divided blocks of corresponding image is not limited to any specific example herein.

Color information of a corresponding block may be extracted by comparing color signal values in divided blocks with a neutral grey color value at S804. A default value may be established as follows: color signal values of corresponding block compared with neutral grey color value are Cb and Cr, and neutral grey color value is 155. If a grey color value is divided by 3 steps, color information of a corresponding block is "0" if coming to a neutral grey color value, a color information of corresponding block is "1" if going away from neutral grey color value, and a color information of corresponding block is "2" if going farther away from neutral grey color value. This embodiment divides a standard value to extract color information into 3 steps, however, it may be modified to include more than 3 steps.

If color information of all blocks is extracted, a ratio of the extracted color information may be calculated and the calculated ratio of color information may be compared with preset critical value at S805. If the ratio of color information is greater than or equal to a preset critical value at S805, a corresponding image is determined to be color at S806. If the ratio of color information is smaller than preset critical value at S805, a corresponding image is determined to be mono at S807.

Figure 9:
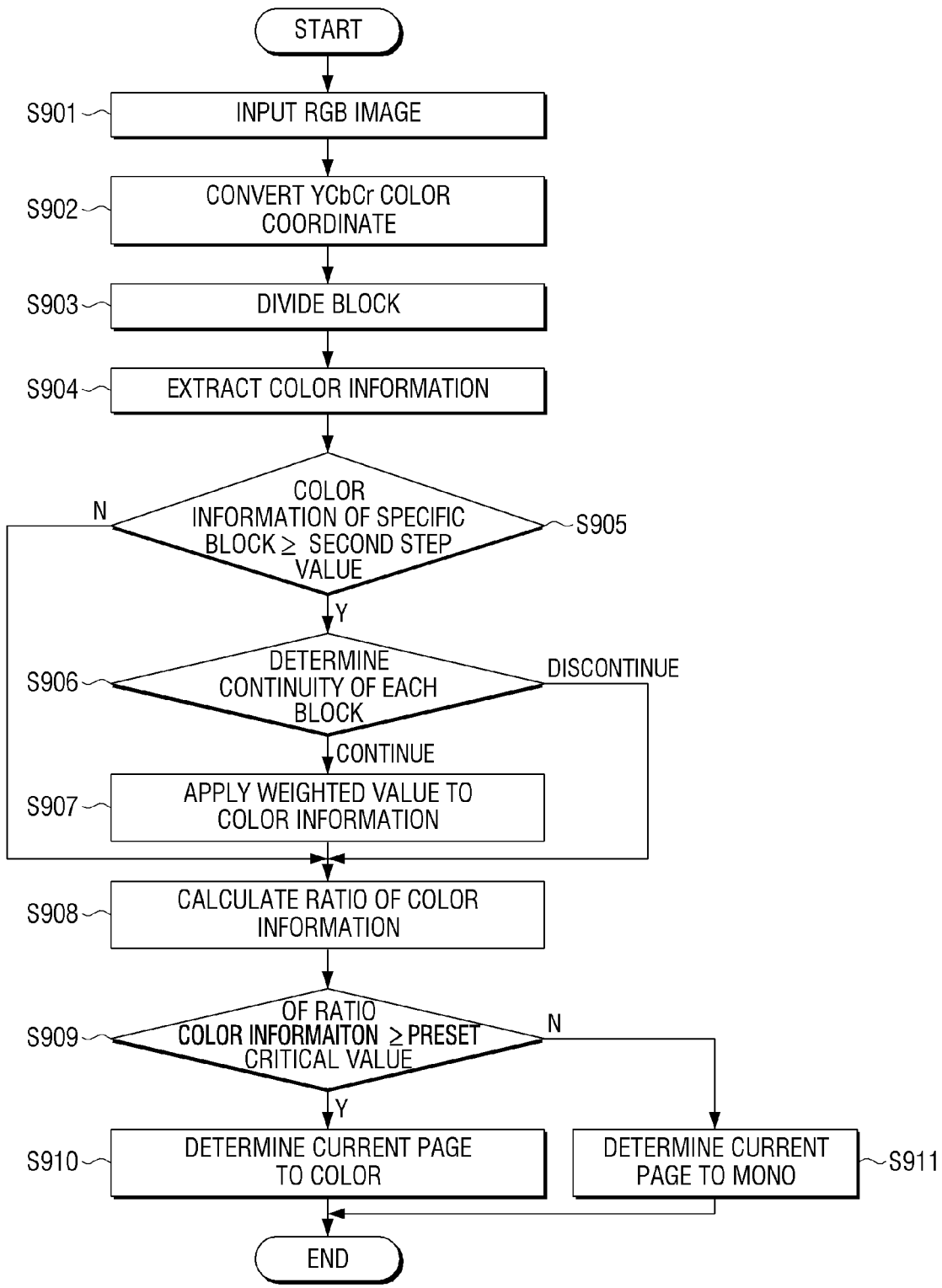
FIG. 9 illustrates a determining continuity of blocks added to an image processing method.

FIG. 9 illustrates an exemplary method for determining continuity of blocks added to the image processing method of FIG. 8.

As illustrated in FIG. 9, the image forming apparatus 200 receives RGB image at S901. Inputted RGB image is converted to YCbCr color coordinate at S902. The YCbCr color coordinate converted image is divided into preset number of blocks at S903. Color information is extracted from divided blocks at S904.

The operation at S904 for extracting color information of FIG. 9 compares color information extracted per block with neutral grey color value as standard value and applies different weighted value to each other according to the difference. For example, if the difference between a color value and a standard value is less than a preset value, the first weighted value is applied to the color value, and if the difference between a color value and a standard value is greater than or equal to a preset value, the second weighted value is applied to the color value.

An embodiment of an image processing method may be based on an example of setting neutral grey color value as a standard value and dividing to 3 step areas. Color information of specific block is compared with the second step value at S905. The second step value may be the standard value for determining color block. For example, if grey color value is divided into 3 step areas; the first step value is allocated to the mono block, and the second and third step values are allocated to the color blocks.

If a specific block is a mono block, i.e., if color information is less than the second step value at S905, the operation of calculating a ratio of color information is performed at S908.

If a specific block is a color block, i.e., if color information is greater than or equal to the second step value at S905, a determining a continuity of color blocks is at S906. If color blocks are discontinued when determining continuity of all color blocks, a calculating ratio of color information is at S908. If color blocks are continued when determining continuity of all color blocks, a weighted value applies to color information of corresponding block at S907.

According to an exemplary embodiment, continuity of all color blocks can be determined simultaneously while determining color saturation. Thus, a success rate of determining whether the is document to be printed in color format is improved.

If color information of every block is extracted, or if a weighted value applies to color blocks, a ratio of extracted color information may be calculated. The calculated ratio of color information is compared with critical value at S909. If the ratio of color information is greater than or equal to a reset critical value at S909, a corresponding image is determined to be color at S910. If the ratio of color information is less than a preset critical value at S909, a corresponding image is mono at S911.

According to an exemplary image processing method of the image forming apparatus, a case in which color blocks are scattered and a case in which color blocks are gathered can be distinguished, and a more accurate determination made of a color image that a user visually perceives. Regarding the cases in which color blocks are scattered and in which color blocks are gathered, if a number of color blocks is the same in these cases, conventional methods may not distinguish both of them. However, the image processing method according to an exemplary embodiment of the present invention can distinguish a case of scattered color blocks from a case of gathered color blocks, and thus, determining whether the image is color can be performed more precisely.

Figure 10:
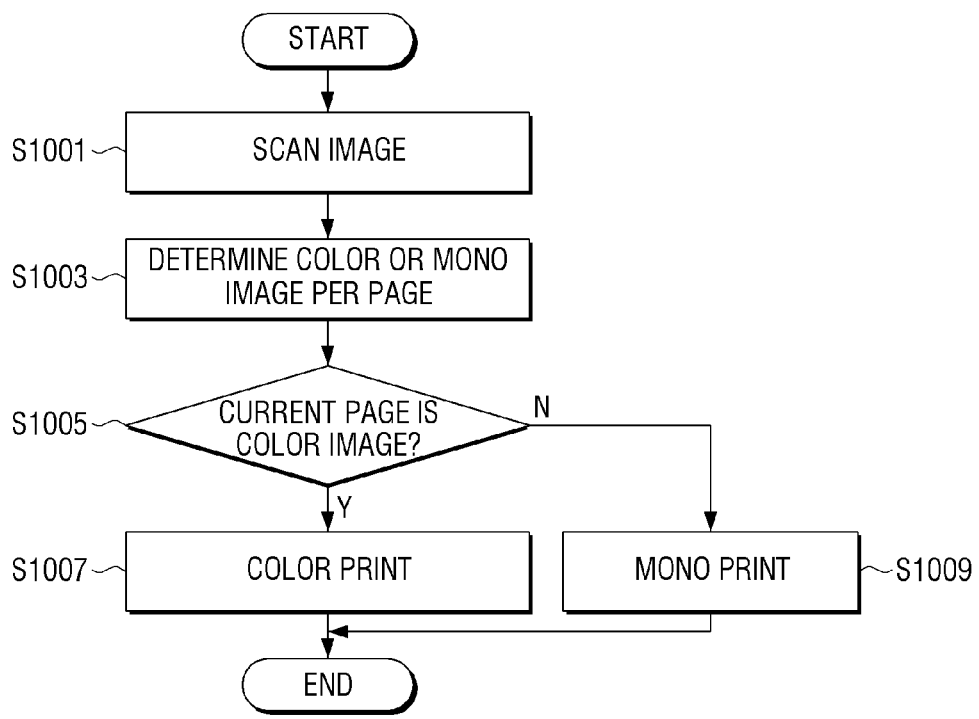
FIG. 10 illustrates a printing controlling method of an image forming apparatus according to an exemplary embodiment.

FIG. 10 illustrates a printing controlling method of an image forming apparatus according to an embodiment.

The image forming apparatus 200 inputs a RGB image of scanned document at S1001, and determines whether each page is color or mono by a method for distinguishing color or mono of the image, for example, as illustrated in FIG. 8 or FIG. 9, at S1003.

The image forming apparatus 200 determines whether a current page is a color image or a mono image at S1005. At the process of S1005, if a current page is determined to be a color image at S1005, the image forming apparatus 200 controls the printer 217 to perform color printing at S1107. Further, at the process of S1005, if a current page is determined to be a mono image at S1005, the image forming apparatus 200 controls the printer 217 to perform mono printing at S1009.

By the above processes, even if a document having a plurality of pages is scanned atone time, each page may be determined to be a color image or a mono image, and color printing or mono printing may be performed selectively according to determined results. Accordingly, if copying document having a plurality of pages combined with color and mono at a same time, color copying and mono copying may be appropriately applied according to an original document.

Further, the image forming apparatus 200 may receive print data regarding a color or a mono image from the printing controlling terminal apparatus 100, and perform printing job by using the received print data.

Figure 11:
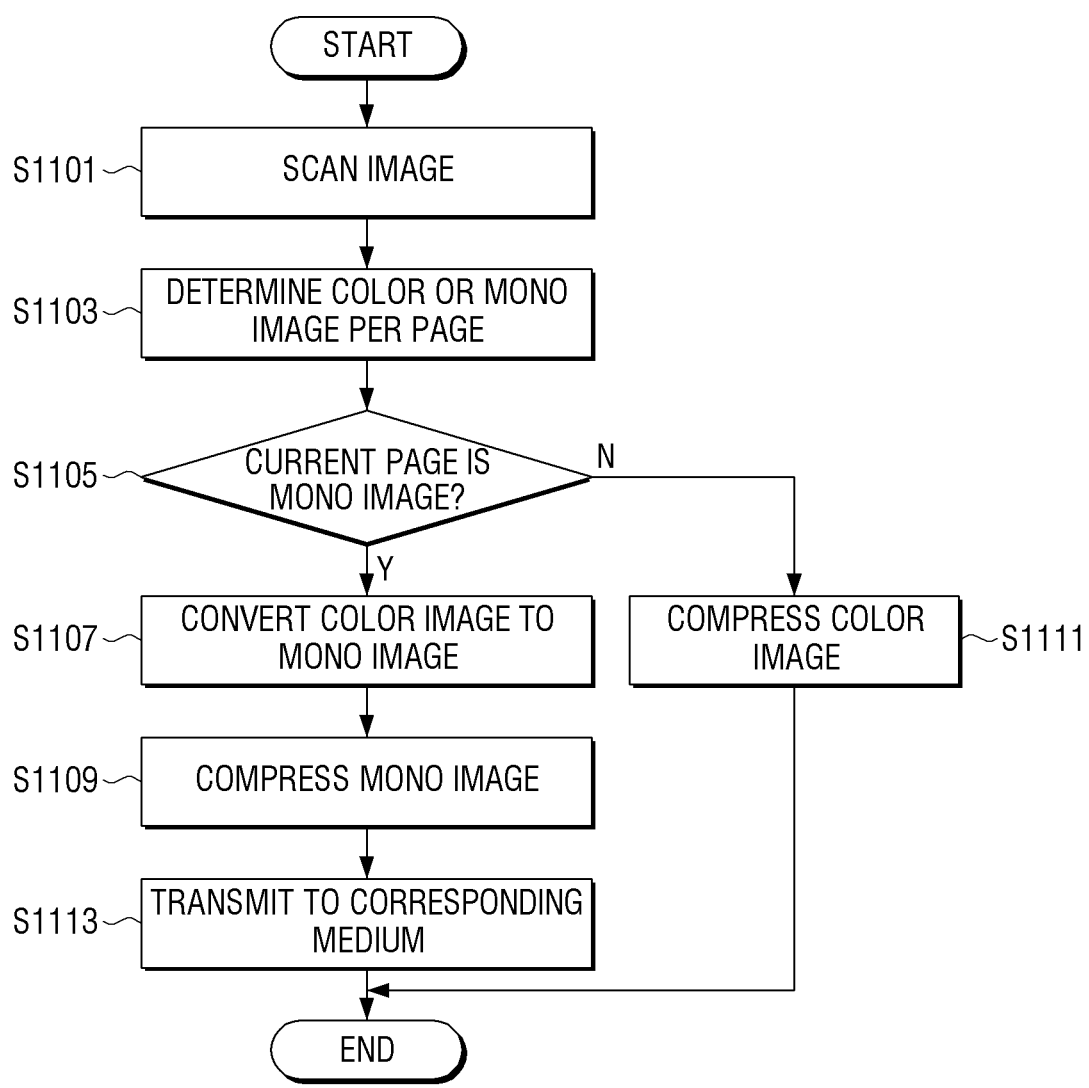
FIG. 11 illustrates a printing controlling method of a printing controlling terminal apparatus according to an embodiment.

FIG. 11 illustrates a printing controlling method of the printing controlling terminal apparatus according to an embodiment.

The printing controlling terminal apparatus 100 inputs RGB image of scanned documents at S1101, and determines whether each page is color image or mono image by the method for distinguishing color or mono of the image illustrated in FIG. 8 or 9 at S1103.

The printing controlling terminal apparatus determines whether current page is mono image or color image at S1105. At the process of S1105, if a current page is determined to be a color image, the printing controlling terminal apparatus 100 compresses current color image in compression format for color image at S1111.

If a current page is mono, the printing controlling terminal apparatus 100 converts the color image to a mono image at S1107, and compresses the current mono image in compression format for mono image at S1109.

The printing controlling terminal apparatus 100 controls the network interface 115 to transmit compressed images in color or mono format to the image forming apparatus 200 at S1113. The image forming apparatus 200 may be an ink jet printer, a laser printer, a combined machine of the above two printers, a fax, a copy machine, a combined machine of the above two printers, the fax, and the copy machine, a user terminal apparatus, and external storing medium.

According to the above process, even if scanning plural documents at once, each page may be determined to be color or mono image, and the image may be compressed in compression format for color or mono image according to determining results. Accordingly, when transmitting image by using network, it may solve declination of transmission speed due to transmitting unnecessary color image.

The above image processing method using an image forming apparatus may be applied to the above image forming apparatus, and may be implemented by at least one running programs to process an image processing method of an image forming apparatus.

A computer program to implement an exemplary method according to various embodiments may be stored and used in various types of recording medium.

Codes to implement exemplary methods may be stored in various types of recording medium that can be read in a terminal such as Random Access Memory (RAM), flash memory, Read Only Memory (ROM), Erasable Programmable ROM (EPROM), Electrically Erasable and Programmable ROM (EEPROM), register, hard disk, removable disk, memory card, USB memory, and CD-ROM.

The foregoing exemplary embodiments and advantages are merely exemplary and are not to be construed as limiting the present invention. The present teaching can be applied to other types of apparatuses. A description of the exemplary embodiments of the present inventive concept is illustrative, and not limiting the scope of the claims.

What is claimed is:

1. A printing controlling terminal apparatus, comprising:
   a user interface that receives a command to print regarding a document;

a determiner that determines if the document intended by the command to print is to be printed in color;
a print data generator that generates print data regarding the document according to a result of the determining; and
a communicator that transmits the generated print data to an image forming apparatus,
wherein the determiner divides each page of the document into a plurality of blocks, extracts color information from each of the plurality of blocks by applying weighted values to color values of the plurality of divided blocks, and determines whether to print the document in color based on the color information including a continuity of color blocks of the plurality of divided blocks, and
wherein the color information is information determined by differently applying weighted values to color values of the plurality of divided blocks according to a number of continuously-formed color blocks.

2. The printing controlling terminal apparatus of claim 1, wherein the determiner calculates the weighted values based on a difference between the color values of the plurality of blocks and a standard value, and extracts color information per block by applying the calculated weighted values to the color values of the plurality of blocks.

3. The printing controlling terminal apparatus of claim 2, wherein, if the difference is smaller than a preset value, the determiner extracts the color information as a first step value by applying a first weighted value to the color value and, if the difference is greater than or equal to the preset value, the determiner extracts color information as greater than, or equal to, a second step value by applying a second weighted value to the color value.

4. The printing controlling terminal apparatus of claim 3, wherein the determiner determines whether to print in color by determining both the continuity and a color saturation of the blocks having a value greater than, or equal to, the second step value.

5. The printing controlling terminal apparatus of claim 4, wherein, if the blocks having a value greater than, or equal to, the second step value more than a preset number continuously exist in a horizontal or a vertical direction, the determiner applies a preset weighted value to the color information of corresponding blocks according to the number of the continuously-existed blocks.

6. The printing controlling terminal apparatus of claim 1, wherein, if a ratio of the color information is greater than or equal to a preset critical value, the determiner determines the document to be color, and if ratio of the color information is less than the preset critical value, the determiner determines the document to be mono.

7. An image forming apparatus, comprising:
a determiner that determines whether to print print data regarding a document in color;
an image processor that generates a printing image regarding the print data according to a result of the determining; and
an image former that performs a printing job by using the generated printing image,
wherein the determiner divides each page of the document into a plurality of blocks, extracts color information from each of the plurality of blocks by applying weighted values to color values of the plurality of divided blocks, and determines whether to print the document in color format based on the color information including a continuity of color blocks of the plurality of divided blocks, and
wherein the color information is information determined by differently applying weighted values to color values of the plurality of divided blocks according to a number of continuously-formed color blocks.

8. The image forming apparatus of claim 7, wherein the determiner calculates the weighted values based on a difference between the color values of the plurality of blocks and a standard value, and applies the calculated weighted values to the color values of the plurality of blocks to weight each of color information.

9. The image forming apparatus of claim 8, wherein, if the difference is smaller than a preset value, the determiner extracts the color information as a first step by applying the first weighted value to the color value, and if the difference is greater than, or equal to, the preset value, the determiner extracts the color information as greater than the second step value by applying the second weighted value to the color value.

10. The image forming apparatus of claim 7, wherein, if a ratio of the color information is greater than or equal to a preset critical value, the determiner determines the document to be color, and if ratio of the color information is less than the preset critical value, the determiner determines the document to be mono.

11. The image forming apparatus of claim 10, wherein the determiner determines whether to print in color by determining both the continuity and a color saturation of the blocks having a value greater than or equal to the second step value.

12. The image forming apparatus of claim 11, wherein, if the blocks having a value greater than or equal to the second step value continuously exist for more than a preset number on horizontal or vertical direction, the determiner applies a preset weighted value to the color information of corresponding blocks according to the number of the continuously-existed blocks.

13. A printing controlling method of a printing controlling terminal apparatus, the printing controlling method comprising:
inputting a command to print regarding a document;
determining if the document intended by the command to print is to be printed in color;
generating print data regarding the document according to a result of the determining; and
transmitting the generated print data to an image forming apparatus,
wherein the determining divides each page of the document into a plurality of blocks, extracts color information from each of the plurality of blocks by applying weighted values to color values of the plurality of divided blocks, and determines whether to print the document in color based on the color information including a continuity of color blocks of the plurality of divided blocks, and
wherein the color information is information determined by differently applying weighted values to color values of the plurality of divided blocks according to a number of continuously-formed color blocks.

14. The printing controlling method of claim 13, wherein the determining comprises calculating the weighted values based on a difference between the color values of the plurality of blocks and a standard value, and extracting color information by applying the calculated weighted values to the color values of the plurality of blocks, respectively.

15. The printing controlling method of claim 14, wherein, if the difference is smaller than a preset value, the determining comprises extracting the color information as a first step value by applying the first weighted value to the color value, and if the difference is greater than or equal to a preset value, the determining comprises extracting the color information as greater than the second step value by applying the second weighted value to the color value.

16. The printing controlling method of claim 15, wherein the determining comprises determining whether to print in color by determining both the continuity and a color saturation of the blocks having greater than the second step value.

17. The printing controlling method of claim 16, wherein, if blocks having a value greater than or equal to the second step value more than a preset number continuously exist in a horizontal or a vertical direction, the determining comprises applying a preset weighted value to the color information of corresponding blocks according to the number of the continuously-existed blocks.

18. The printing controlling method of claim 13, wherein, if ratio of the color information is greater than or equal to a preset critical value, the determining comprises determining the document to be color, and if ratio of the color information is less than preset critical value, the determining comprises determining the document to be mono.

19. A printing controlling method of an image forming apparatus, comprising:
   determining whether -to print print data regarding a document in color;
   generating printing image regarding the print data according to a result of the determining; and
   performing a printing job by using the generated printing image,
   wherein the determining divides each page of the document into a plurality of blocks, extracts color information from each of the plurality of blocks by applying weighted values to color values of the plurality of divided blocks, and determines whether to print the document in color format based on the color information including a continuity of color blocks of the plurality of divided blocks, and
   wherein the color information is information determined by differently applying weighted values to color values of the plurality of divided blocks according to a number of continuously-formed color blocks.

20. The printing controlling method of claim 19, wherein the determining comprises calculating the weighted values based on a difference between the color values of the plurality of blocks and a standard value, and extracting color information, respectively, by applying the calculated weighted values to the color values of the plurality of blocks.

21. The printing controlling method of claim 20, wherein, if the difference is smaller than a preset value, the determining comprises extracting the color information as a first step value by applying the first weighted value to the color value and, if the difference is greater than the preset value, the determining comprises extracting the color information as greater than the second step value by applying the second weighted value to the color value.

22. The printing controlling method of claim 21, wherein, if ratio of the color information is greater than or equal to a preset critical value, the determining comprises determining the document to be color, and if ratio of the color information is less than the preset critical value, the determining comprises determining the document to be mono.

23. The printing controlling method of claim 21, wherein the determining comprises determining whether to print in color by determining both the continuity and a color saturation of the blocks having greater than or equal to the second step value.

24. The printing controlling method of claim 23, wherein, if the blocks having greater than or equal to the second step value more than a preset number continuously exist on horizontal or vertical direction, the determining comprises applying a preset weighted value to the color information of corresponding blocks according to the number of the continuously-existed blocks.

25. A non-transitory computer-readable recording medium having embedded thereon codes regarding a printing controlling method of a printing controlling terminal apparatus, wherein the printing controlling method comprises,
   inputting a command to print regarding a document;
   determining if the document intended by the command to print is to be printed in color;
   generating print data regarding the document according to a result of the determining; and
   transmitting the generated print data to an image forming apparatus,
   wherein the determining divides each page of the document into a plurality of blocks, extracts color information from each of the plurality of blocks by applying weighted values to color values of the plurality of divided blocks, and determines whether to print the document in color based on the color information including a continuity of color blocks of the plurality of divided blocks, and
   wherein the color information is information determined by differently applying weighted values to color values of the plurality of divided blocks according to a number of continuously-formed color blocks.

* * * * *

UNITED STATES PATENT AND TRADEMARK OFFICE
CERTIFICATE OF CORRECTION

PATENT NO. : 9,171,237 B2  
APPLICATION NO. : 14/078760  
DATED : October 27, 2015  
INVENTOR(S) : Hyung-soo Ohk Page 1 of 1

It is certified that error appears in the above-identified patent and that said Letters Patent is hereby corrected as shown below:

ON THE TITLE PAGE

First Column, (71) Applicant, Line 1
Delete "SAMSUMG" and insert --SAMSUNG--, therefor.

First Column, (71) Applicant, Line 2
Delete "Gyeonggi-so" and insert --Gyeonggi-do--, therefor.

IN THE CLAIMS

Claim 19, Column 17, Line 24
Delete "-to" and insert --to--, therefor.

Claim 25, Column 18, Line 25
Delete "non-transistory" and insert --non-transitory--, therefor.

Signed and Sealed this  
Second Day of February, 2016

Michelle K. Lee  
*Director of the United States Patent and Trademark Office*